(12) United States Patent
Singh

(10) Patent No.: US 6,546,411 B1
(45) Date of Patent: Apr. 8, 2003

(54) HIGH-SPEED RADIX 100 PARALLEL ADDER

(75) Inventor: Shanker Singh, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/454,149

(22) Filed: Dec. 3, 1999

(51) Int. Cl.[7] .............................................. G06F 7/50
(52) U.S. Cl. ....................................................... 708/710
(58) Field of Search ................................ 708/711, 712, 708/673, 307, 710, 703, 714, 525, 518

(56) References Cited

U.S. PATENT DOCUMENTS

| | | | | |
|---|---|---|---|---|
| 3,935,438 A | * | 1/1976 | Grupe ......................... | 708/673 |
| 3,983,382 A | * | 9/1976 | Weinberger .................. | 708/307 |
| 4,010,359 A | | 3/1977 | Weber et al. ................ | 708/670 |
| 4,172,288 A | * | 10/1979 | Anderson .................... | 708/673 |
| 4,441,159 A | | 4/1984 | Hart ............................ | 708/673 |
| 4,584,661 A | | 4/1986 | Grundland .................. | 708/712 |
| 5,276,635 A | | 1/1994 | Naini et al. .................. | 708/713 |
| 5,508,952 A | * | 4/1996 | Kantabutra .................. | 708/673 |

OTHER PUBLICATIONS

"Floating Point Number Format with Number system with Base of 1000," *IBM Technical Disclosure Bulletin* vol. 41, No. 01, Jan. 1998, 609–610.

* cited by examiner

*Primary Examiner*—Chuong Dinh Ngo
*Assistant Examiner*—Chat Do
(74) *Attorney, Agent, or Firm*—Sawyer Law Group LLP

(57) ABSTRACT

The present invention provides an improved method and apparatus for performing decimal arithmetic using conventional parallel binary adders. In a first aspect of the present invention, a method for implementing decimal arithmetic using a radix (base) 100 and a method for implementing radix 1000 numbering system are disclosed. The first aspect of the present invention implements decimal arithmetic utilizing radix 100, where one-hundred decimal numbers, 0 through 99, are represented using seven BCD bits. In a second aspect of the present invention, a specialized high-speed radix 100 parallel adder is disclosed.

8 Claims, 16 Drawing Sheets

| Decimal Digit Represented | BCD coding b3 b2 b1 b0 |
|---|---|
| 0 | 0 0 0 0 |
| 1 | 0 0 0 1 |
| 2 | 0 0 1 0 |
| 3 | 0 0 1 1 |
| 4 | 0 1 0 0 |
| 5 | 0 1 0 1 |
| 6 | 0 1 1 0 |
| 7 | 0 1 1 1 |
| 8 | 1 0 0 0 |
| 9 | 1 0 0 1 |
|   | 1 0 1 0 |
|   | 1 0 1 1 |
|   | 1 1 0 0 |
|   | 1 1 0 1 |
|   | 1 1 1 0 |
|   | 1 1 1 0 |

} Invalid

Prior Art

FIG. 1A

```
A       | 0111 | 0101 | 0010
B       | 1000 | 0011 | 0110
+       | 0110 | 0110 | 0110    ← Forced Sixes
        | 0101 | 1110 | 1110    ← Digit Sum
     1|   NC     NC              ← Digit Carry
+              | 1001 | 1001    ← Subtract Sixes
+                    1      1    ← Add 1
     1 | 0101 | 1000 | 1000      ← Final Sum
Final Carry ◄
```

Prior Art

FIG. 1B

Decimal Number A =   71340561
Decimal Number B =   199256648

Radix 100 Repr. of A =    08   |   71   |   34   |   05   |   61
Binary Coded Repr. of A = 0001000 | 1000111 | 0100010 | 0000101 | 0111101

Radix 100 Repr. of B =    91   |   99   |   25   |   66   |   48
Binary Coded Repr. of B = 1011011 | 1100011 | 0011001 | 1000010 | 0110000

Radix 100 BCD Addition of A & B:

|  | A | 0001000 | 1000111 | 0100010 | 0000101 | 0111101 |
|---|---|---|---|---|---|---|
|  | B | 1011011 | 1100011 | 0011001 | 1000010 | 0110000 |
| Forced binary 28s' | | 0011100 | 0011100 | 0011100 | 0011100 | 0011100 |

Add the Three Binary Strings = 1 | 0000000 | 1000110 | 1010111 | 1100100 | 0001001

Carry/No Carry at Radix 100:   C    C    NC    NC    C

Subtract Binary 28's where NC by:
ADD 1's complement                          | 1100011 | 1100011 |
ADD Hot 1                                        1          1

Final Answer        = 1 | 0000000 | 1000110 | 0111011 | 1001000 | 0001001
Radix 100 Representation: 1 | 00 | 70 | 59 | 72 | 09

Final Sum =  1101111000 | 1111100001 | 0110001010 | 0011011110

Radix 1000=     888          991          384          222

FIG. 4

Addition of two Radix 100 BCD Digits (A & B)

|  | a7 | a6 | a5 | a4 | a3 | a2 | a1 |
|---|---|---|---|---|---|---|---|
|  | b7 | b6 | b5 | b4 | b3 | b2 | b1 |
| Half Sum | h7 | h6 | h5 | h4 | h3 | h2 | h1 |
| Bit Carry | c6 | c5 | c4 | c3 | c2 | c1 | c-in |
| Digit Sum | s7 | s6 | s5 | s4 | s3 | s2 | s1 |
| Digit Carry Out | ← $C_{out}$ | | | | | | |

FIG. 5

HIGH-SPEED RADIX 100 PARALLEL ADDER

CROSS-REFERENCE TO RELATED APPLICATIONS

The present invention is related to co-pending U.S. patent application Ser. No. 09/434,395, entitled "A Method And Apparatus For Performing Decimal Arithmetic Using Radix 100 and 1000," filed on Nov. 4, 1999, assigned to the assignee of the present application, and incorporated herein by reference.

FIELD OF THE INVENTION

The present invention relates generally to high-speed adders, and more particularly to a method and apparatus for performing arithmetic using a high-speed radix 100 parallel adder.

BACKGROUND OF THE INVENTION

Input to conventional binary parallel adders are decimal digits represented in binary coded decimal (BCD) format. As shown in FIG. 1A, BCD uses a combination of four binary bits, $b_3$, $b_2$, $b_1$, and $b_0$, to represent the decimal digits 0 through 9. In the binary number system, each $b_i$ coefficient has a value of 0 or 1, and the subscript value i indicates the power of 2 by which the coefficient must be multiplied:

$$b_3*2^3+b_2*2^2+b_1*2^1+b_0*2^0$$

The decimal number a system, in contrast, is said to be of base, or radix, 10 because it uses 10 digits and each coefficient is multiplied by powers of 10. Each digit of a decimal number input into a computer is converted into the corresponding BCD code before arithmetic operations are performed on the number.

FIG. 1B is a diagram showing an example addition of two BCD operands by a conventional binary parallel adder. The operand A is the representation of the decimal number 752 and operand B is the representation of the decimal number 836. Each digit in the operands is represented by a corresponding 4-bit BCD digit. The adder adds the corresponding BCD digits from the operands, which produces digit sums and digit carries for each coefficient, where the digit carries are added to the next set of digits.

Referring again to FIG. 1A, the four BCD variables have a total of sixteen distinct codes or values, only ten of which are used for representing decimal digits. The remaining six values are not used or are invalid. The addition of two BCD digits has the potential to produce a value that is invalid. That is, any digit sum greater than 1001 is invalid and must be corrected during the addition.

Referring back to FIG. 1B, a binary parallel adder ensures that every digit sum results in a valid value by adding binary six (0110) to each digit addition, which is referred to as "forcing sixes." Each digit sum is then examined for digit carries. If a digit sum did produce a digit carry, then adding the binary six was necessary to produce a valid digit sum. If a digit sum did not produce a digit carry (NC), then the addition of the binary six was unnecessary, so the binary six is subtracted from the digit sum. This is done by adding the 1's complement of binary six (1001) and a hot 1 for the 2's complement. The result is a final sum that also may or may not include a final carry. In this example, the final sum includes a final carry and represents the decimal number 1588.

As the example shows, the adder performs three additions per digit to produce the final sum. Of course, conventional adders are sophisticated enough to perform all these operations in parallel to speed computations. Although the design of a conventional parallel binary adder is adequate, the method of representing radix 10 numbers in BCD has disadvantages.

One disadvantage with performing arithmetic on radix 10 numbers in BCD is that the BCD code is inefficient because six of the ten combinations are not used. In addition, in order to allow byte operations, each 4-bit BCD digit is padded with 4-bits (typically 111) to make an eight bit value. Thus, one byte, or eight bits, is used to represent only nine values, which is inefficient from a coding point of view.

Another disadvantage with performing binary arithmetic by a binary parallel adder on radix 10 numbers is that when interacting with computers, humans prefer to input numbers and view results in decimal form (radix 10). However, in the binary system, certain arithmetic operations do not produce results that humans expect. For example, humans would expect the result of 1 divided by 5 to be 0.2. But after this arithmetic is performed in a binary number system by a conventional adder, the result is often 0.19999.

Accordingly, what is needed is an improved method and apparatus for performing decimal arithmetic. In addition, the method and apparatus should perform on pair with conventional high-speed binary adders. The present invention addresses such a need.

SUMMARY OF THE INVENTION

The present invention provides a method and apparatus for performing radix 100 decimal arithmetic. A radix 100 parallel adder is disclosed comprising several levels of logic for adding at least two operands, each having at least one seven-bit radix 100 digit. A first logic level receives the at least two operands and generates outputs comprising a bit carry propagate value, a bit carry generate value, and half sum value for each bit position. A second logic level receives the output from the first logic level and generates outputs comprising group carry propagate values and group carry generate values. A third logic level receives the output from the second logic level and generates outputs comprising a digit carry-out value. A fourth logic level receives the outputs from first logic level and generates outputs comprising bit carry values. A fifth logic level receives the output from the second logic level and generates outputs comprising a digit group carry generate and a digit group carry propagate for the at least one radix 100 digit. And a sixth logic level receives the output is from the first logic level and the outputs from the fourth logic level and generates a final sum for the at least one radix 100 digit.

According to the apparatus and method disclosed herein, the several levels of logic of the radix 100 parallel operate in parallel to provide the final sum within one clock cycle and should be as fast as today's state-of-the-art high-speed parallel binary adders.

BRIEF DESCRIPTION OF THE DRAWINGS

FIG. 1A is a table illustrating the BCD representation of conventional radix 10 decimal digits 0 through 9 using combination of four binary bits.

FIG. 1B is an example showing an example addition of two BCD operands by a conventional binary parallel adder.

FIG. 3 is a diagram describing radix 100 BCD arithmetic using a conventional binary adder by way of example.

FIG. 4 is a diagram describing radix 1000 BCD arithmetic using a conventional binary adder by way of example.

FIG. 5 is a diagram showing the addition of two seven-bit radix 100 digits (a and b).

DETAILED DESCRIPTION

The present invention provides a high-speed radix 100 parallel adder for performing decimal arithmetic in computers. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention provides an improved method and apparatus for performing decimal arithmetic using conventional parallel binary adders. In a first aspect of the present invention, a method for implementing decimal arithmetic using a radix (base) 100 and a method for implementing radix 1000 numbering system are disclosed. In a second aspect of the present invention, a specialized high-speed radix 100 parallel adder is disclosed.

The first aspect of the present invention implements decimal arithmetic utilizing radix 100, where one-hundred decimal numbers, 0 through 99, are represented using seven BCD bits. For byte operations, only one bit is necessary for padding, thereby providing a more is efficient coding representation. In addition, the numbering scheme of the present invention is also compatible with binary adders in use today.

Figure 2:
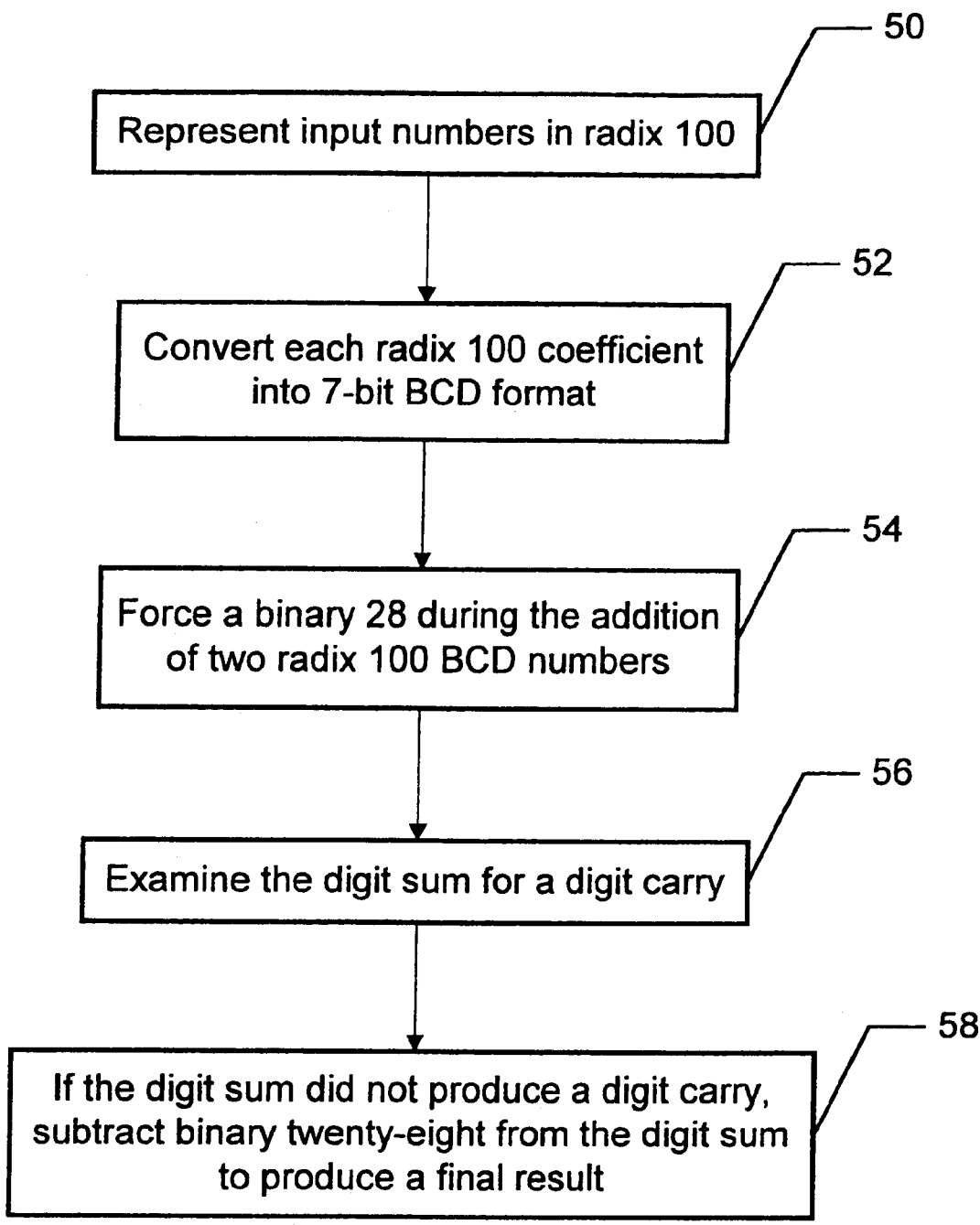
FIG. 2 is a flow chart depicting radix 100 arithmetic.

FIG. 2 is a flow chart illustrating the process for performing decimal arithmetic with a conventional binary parallel adder using a radix 100 numbering system. The process begins by representing input numbers in radix 100 format in step 50.

Referring now to FIG. 3, a diagram is shown in which radix 100 BCD arithmetic performed by a conventional binary adder is described by way of example. Assume that two input decimal numbers 871340561 and 9199256648 need to be added. The radix 100 representation of the two numbers will be 08|71|34|05|61 and 91|99|25|66|48, respectively, where each pair of digits is treated as a single coefficient.

Referring again to FIG. 2, the next step is to convert each radix 100 coefficient into BCD format using seven binary bits, $b_6$, $b_5$, $b_4$, $b_3$, $b_2$, $b_1$, and $b_0$, to represent the decimal digits 0 through 99 in step 52, where the binary value is given by:

$$b_6*2^6+b_5*2^5+b_4*2^4+b_3*2^3+b_2*2^2+b_1*2^1+b_0*2^0=b_6*64+b_5*32+b_4*16+b_3*8+b_2*4+b_1*2+b_0*1$$

Thus, given a decimal number, each radix 100 digit (0–99) is converted into an equivalent 7-bit BCD value. Referring to the example in FIG. 3, the two radix 100 numbers are converted into 7-bit BCD representation as shown.

The seven BCD bits have a total of 128 distinct values (0–127), only 0 to 99 of which are used for representing radix 100 digits. The remaining 28 values are not used or are invalid. The addition of two radix 100 BCD digits has the potential to produce a value that is invalid. That is, any digit sum greater than 1100100 is invalid and must be corrected during the addition.

Therefore, referring to FIGS. 2 and 3, given two radix 100 BCD digits to be added, the present invention forces a binary twenty-eight (0011100) during the addition to produce a digit sum in step 54. The digit sum is then examined for digit carries in step 56.

If the digit sum did produce a digit carry, then adding the binary twenty-eight was necessary to produce a valid digit sum. If the digit sum did not produce a digit carry (NC), then the addition of the binary twenty-eight was unnecessary, so the binary twenty-eight is subtracted from the digit sum in step 58. This is done by adding the 1's complement of binary twenty-eight (1100011) and a hot 1 for 2's complement. As shown in the example of FIG. 3, the final sum produced by this method is 1,00,70,59,72,09 in radix 100 representation. The maximum positive number that could be represented by 36 bits will be 79,99,99,99,99 and by 32 bits will be 07,99,99,99,99 implying that the highest four bits are always 0000, because there is no hardware.

According to the present invention, improved BCD coding efficiency is obtained since byte operations are achieved with a 1 bit pad (7 BCD bits+1 bit pad=1 byte). In addition, improved accuracy and human-centric results are achieved because all digits between 0 through 99 are valid during decimal arithmetic, instead of only 0 through 9.

In a second embodiment of the present invention, a radix 1000 representation is used, which may provide more efficiency in certain situations. In radix 1000 arithmetic, one-thousand decimal numbers, 0 through 999, are represented using ten BCD bits. For two 16-bit byte operations, six bits of padding are required. And for 12-bit byte operations, only two bits of padding are required.

FIG. 4 is a diagram describing radix 1000 BCD arithmetic using a conventional binary adder by way of example. Assume that two input decimal numbers 825504543999 and 63486840223 need to be added. The radix 1000 representation of the two numbers will be 825|504|543|999 and 63|486|840|223, respectively, each having four coefficients. Each radix 1000 coefficient is then converted into BCD format using ten binary bits, $b_9$, $b_8$, $b_7$, $b_6$, $b_5$, $b_4$, $b_3$, $b_2$, $b_1$, and $b_0$.

The ten BCD bits have a total of 1024 distinct values (0–1023), only 0 to 999 of which are used for representing radix 1000 digits. The remaining 24 values are not used or are invalid. The addition of two radix 1000 BCD digits resulting in a digit sum greater than 999 is corrected during addition by forcing a binary twenty-four (0000011000) during the addition. A binary twenty-four is then subtracted from the digit sums that did not produce a carry by adding the 1's complement of binary twenty-four and adding hot 1's. This results in the final sum of 88899138422.

In a second aspect of the present invention, there is provided a logic design for a high-speed radix 100 parallel look-ahead adder where the sum digits of two or more operands are generated in parallel within one clock cycle.

Referring now to FIG. 5, the addition of two seven-bit radix 100 digits (a and b) is shown. During the addition, each of the seven bit positions (i) will produce a half sum ($h_i$), a bit carry ($c_i$), and a full sum ($s_i$). The half sum and the full sum for each bit position can be expressed as:

$$hi = ai \oplus bi$$

$$si = hi \oplus ci-1,$$

where $\oplus$ represents an exclusive-OR function and ci−1 is the bit carry from the previous position. The half sums and bit carries are then added bitwise to produce the digit sum (s) and digit carry out ($C_{out}$).

Whether or not a carry is generated for a particular bit position is determined by a carry generate function:

$$gi = ai*bi, \text{ where * represents an AND function.}$$

Whether or not a carry is propagated through a particular bit position is determined by a carry propagate function:

$$pi = ai + bi, \text{ where + represents an OR function.}$$

Figure 6:
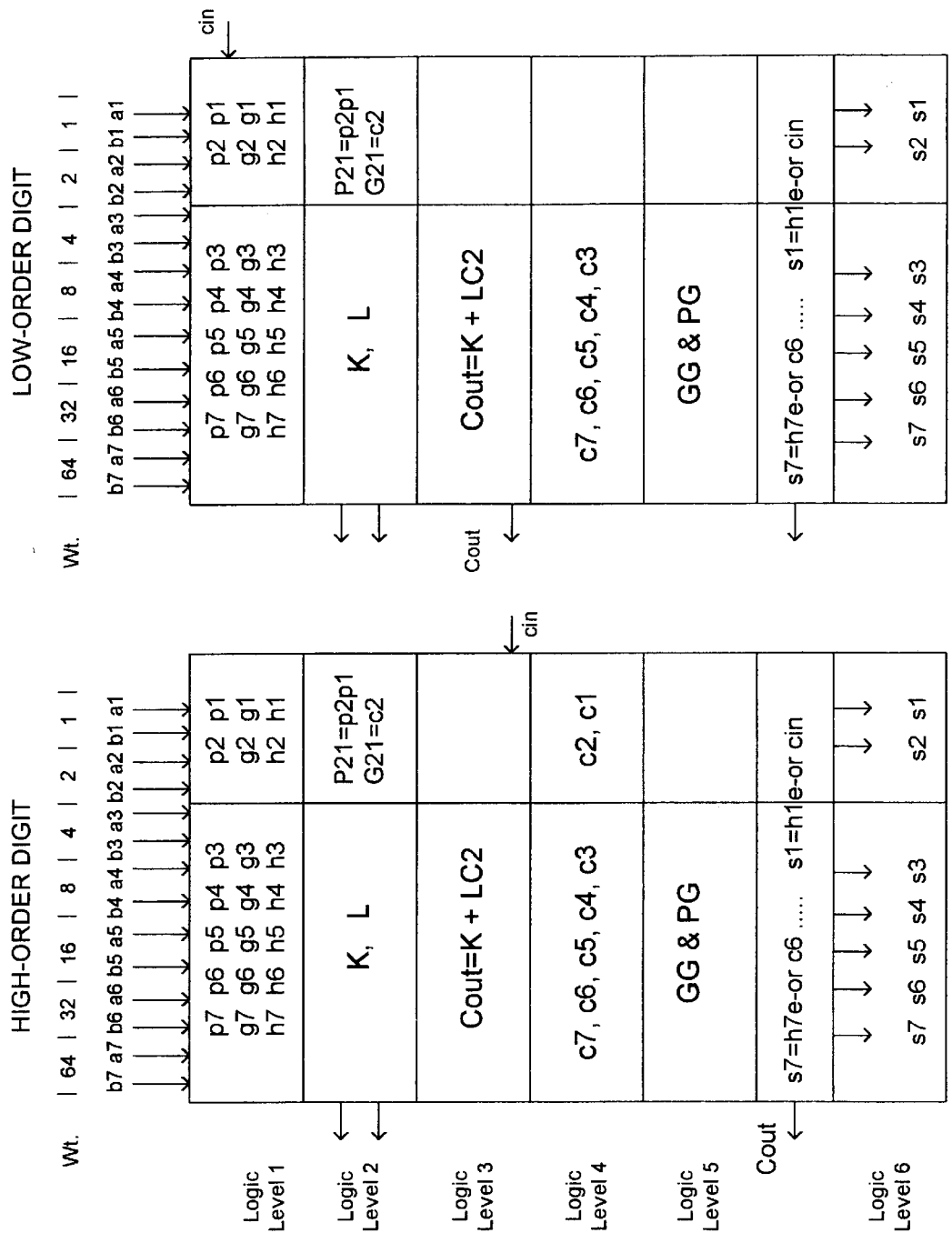
FIG. 6 is a logic diagram showing a high-speed radix 100 parallel adder in accordance with the present invention.

Referring now to FIG. 6, a logic diagram is shown of a high-speed radix 100 parallel adder 60 in accordance with the present invention. The input to the adder 60 may be any number of radix 100 operands comprising N digits each. For simplicity, however, only one high-order radix 100 digit and one low-order radix 100 digit from operands A and B are shown being input to the adder 60.

According to the present invention, the radix 100 parallel adder 60 includes several levels of logic operating in parallel to provide a final sum (s) within one clock cycle. In a preferred embodiment, the radix 100 parallel adder (hereinafter, the adder) 60 includes six levels of logic. The order of the levels, however is not sequence dependent.

In operation, the adder 60 determines bit-by-bit if whether there will be an input carry (carry propagate) and/or whether there will be an output carry (carry generate) without actually waiting for the carries to propagate through the bits during the addition. The carry propagate and carry generate functions are performed on the first level of logic for all bits. The other levels of logic are arranged so that all digitwise calculations are performed in parallel.

Logic level 1 receives as inputs one or more radix 100 digits from at least two operands and a carry-in ($c_{in}$) from a lower order digit, if any. Using the inputs, logic level 1 generates a bit carry propagate ($p_i$) value, a bit carry generate ($g_i$) value, and a half sum ($h_i$) value for each bit position.

Figure 7:
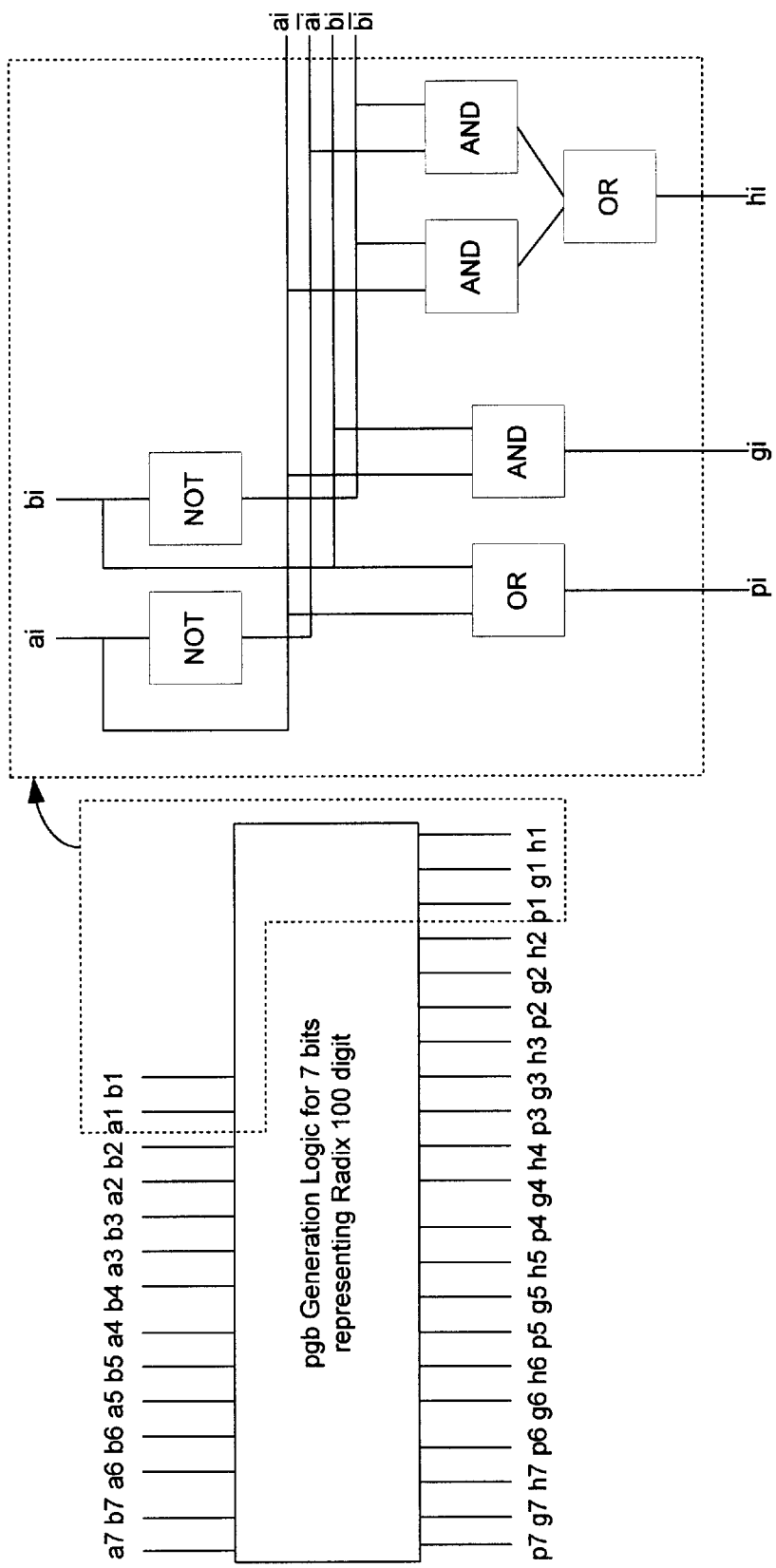
FIG. 7 is a diagram illustrating example logic circuits for implementing the bit carry propagate, bit carry generate, and half sum functions using AND and OR gates.

FIG. 7 is a diagram illustrating example logic circuits for implementing the bit carry propagate ($p_i$), bit carry generate ($g_i$) and half sum ($h_i$) functions using AND and OR gates. It should also be recognized the logic levels not only provide bit signals for each digit, but also provide the complement of those signals for input into the logic gates.

Referring again to FIG. 6, logic level 2 receives the output from logic level 1 and generates group carry values. Applicant of the present invention, has recognized that the bit carry for the group comprising bit positions 3 through 7 are independent of the bit carry values for the group comprising bit positions 1 and 2, and that the group carry values are dependent upon only the bit carry values for bit positions 1 and 2. It has also been recognized that the value of the radix 100-digit $C_{out}$ is independent of the full sums ($s_i$) for bit positions 1 and 2.

Given these observations, the present invention partitions the seven bit positions into two groups, a low-order group comprising bit positions 2 and 1, and a high-order group comprising bit positions 7 through 3. The bit carry values in the low-order group are generated separately from the high-order group, and the group carry values are generated accordingly.

Since the group carry values are only dependent on the bit carry values of the low-order group, the bit carry values for the low-order group are generated in logic level 2, while the bit carry values for the high-order group are generated in logic level 5, described further below. The bit carry values for bit positions 2 and 1 are generated using the bit carry generate and the bit carry propagate for bits 2 and 1 along with the carry-in:

$$c1 = g1 + C_{in}*p1$$

$$c2 = g2 + g1*p2 + C_{in}*p1*p2$$

Similarly, a group carry propagate and a group generate for the low and high-order groups are generated separately.

$$P_{2,1} = p1*p2$$

While the low-order group carry generate function for bits 2 and 1 ($G_{2,1}$) is given by:

$$G_{2,1} = c2$$

Figure 8:
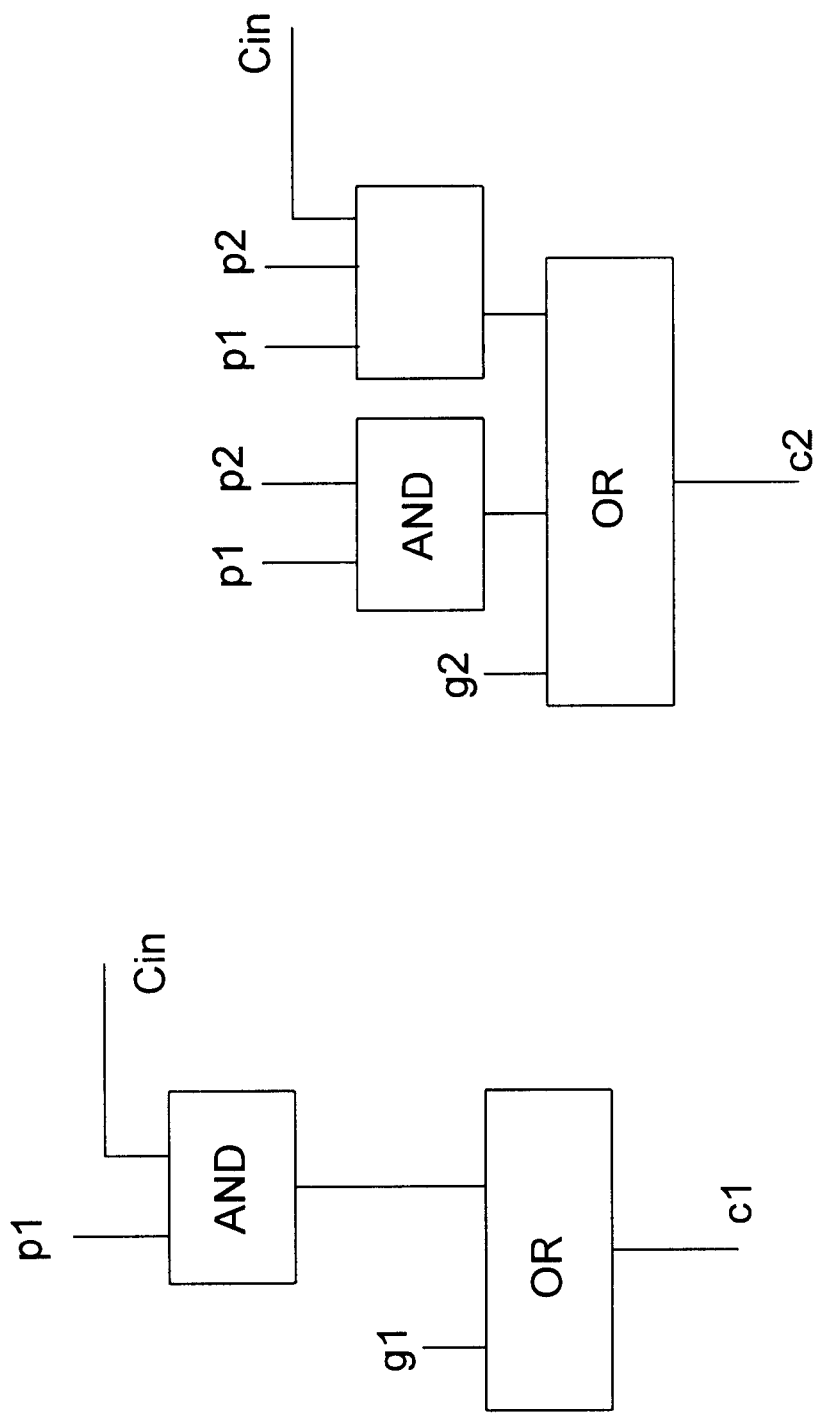
FIG. 8 is a diagram illustrating example logic circuits for implementing the bit carry functions for the low-order group, bits 2 and 1.

FIG. 8 is a diagram illustrating example logic circuits for implementing the bit carry group for the low-order group, bits 2 and 1, c1 and c2. The low-order group carry propagate function for bits 2 and 1 ($P_{2,1}$) is given by:

Referring again to FIG. 6, logic level 2 also generates a high-order group carry generate function (K) and a high-order group carry propagate function (L) for bits 7 through 3. In accordance with the present invention, K and L are used as a look-ahead scheme to generate the digit carry-outs in parallel. When K and L are expressed in terms of $p_i$, $g_i$, and $h_i$, K and L can be generated at earlier logic levels. Grouping in this manner makes the K and L functions independent of bit positions 1 and 2. And the final sum for bit positions 1 and 2 is independent of the radix 100 $C_{out}$.

Figure 9:
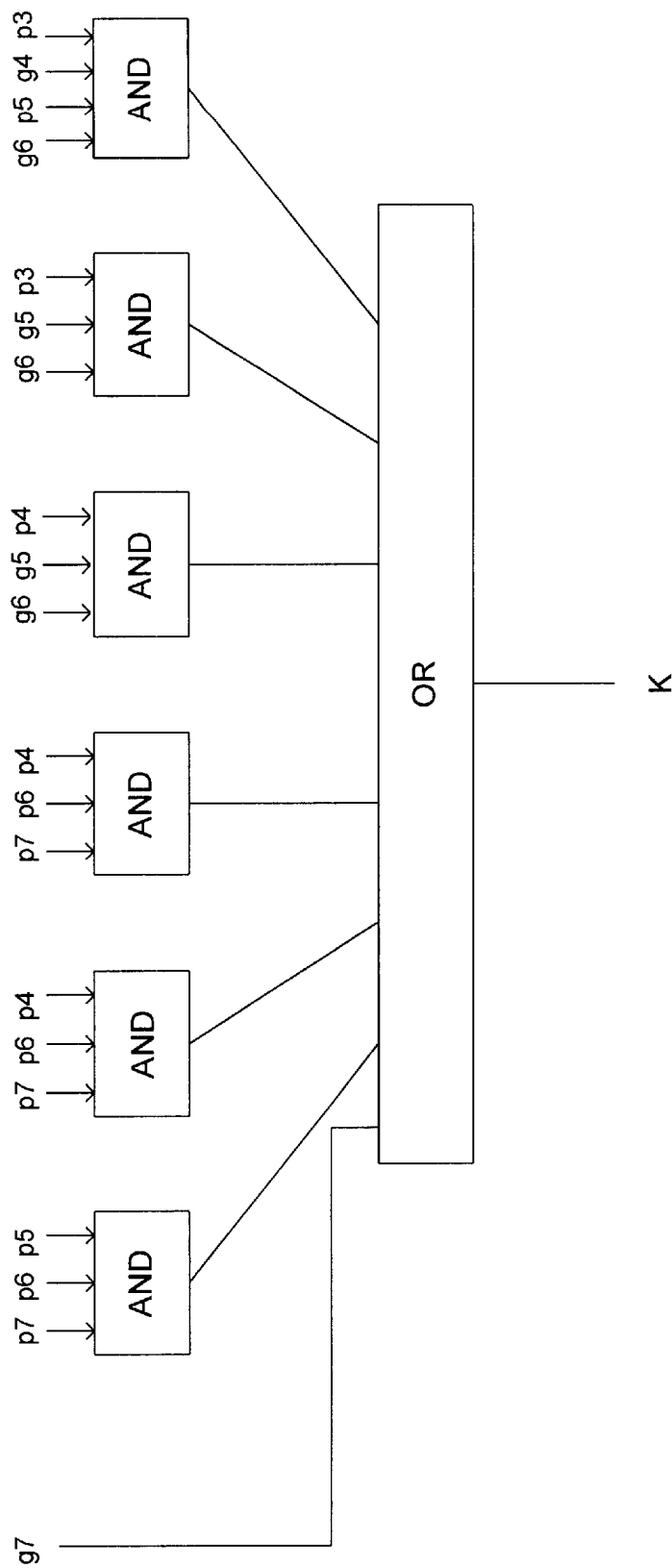
FIG. 9 is a diagram illustrating example logic circuits for implementing K in accordance with the present invention.

FIG. 9 is a diagram illustrating example logic circuits for implementing K in accordance with the present invention. Since the weights of bit positions 7, 6, 5, 4, and 3 are 64, 32, 16, 8 and 4, respectively, the function K can be expressed as the sum of bit positions 7 through 3 when their total is greater than or equal to 100 or:

$$K = g7 + p7*p6*p5 + p7*p6*p4 + p7*p6*p3 + p7*p6*p5 + g6*g5*p4 + g6*g5*p3 + g6*p5*g4*p3$$

Figure 10:
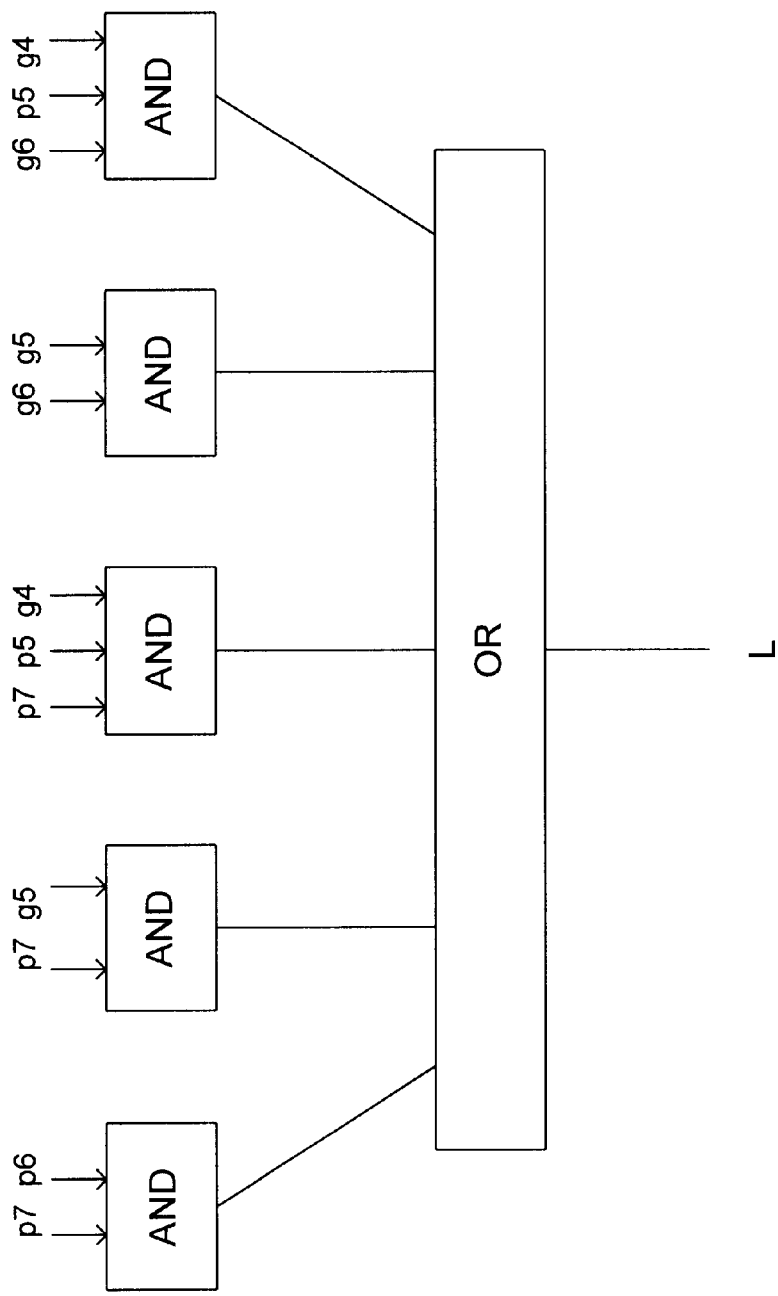
FIG. 10 is a diagram illustrating example logic circuits for implementing L in accordance with the present invention.

Referring to FIG. 10, a diagram illustrating example logic circuits for implementing L in accordance with the present invention is shown. L can be expressed as the sum of bit positions 7 through 3 when their total is greater than or equal to 96 or:

$$L = p7*p6 + p7*g5 + p7*p5*g4 + g6*g5 + g6*p5*g4$$

Referring again to FIG. 6, logic level 3 receives the output from logic level 2 and generates the digit carry-out, $C_{out}$, which is dependent upon K and L. Since K and L are generated at such an early logic level, $C_{out}$ may also be generated at an earlier logic level.

Figure 11:
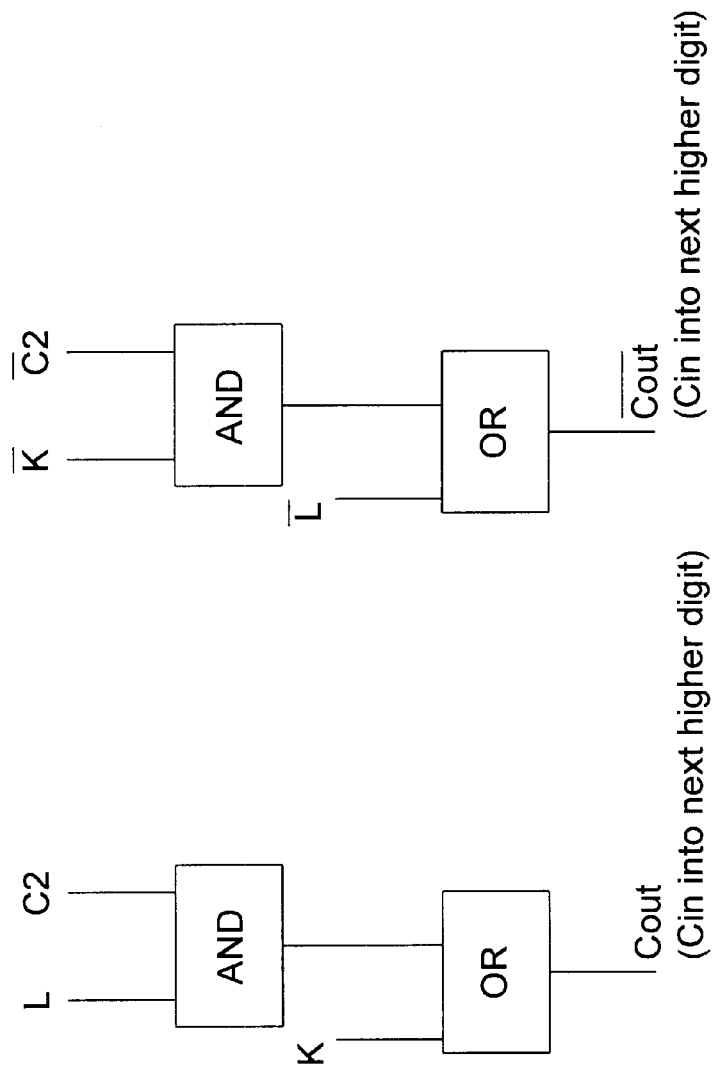
FIG. 11 is a diagram illustrating example logic circuits for implementing $C_{out}$.

FIG. 11 is a diagram illustrating example logic circuits for implementing $C_{out}$. As shown, the carry out function for a radix 100 digit is generated by the function:

$C_{out}=K+L*c2$

Referring again to FIG. 6, logic level 4 receives the carry-in, and the bit carry propagate and bit carry generate outputs from logic level 1 and generates the bit carries ($c_i$) for the high-order group, bits 7 through 3. Alternatively, the bit carry values for the low-order group may also be generated in logic level 4, rather than in logic level 2.

Figure 12A:
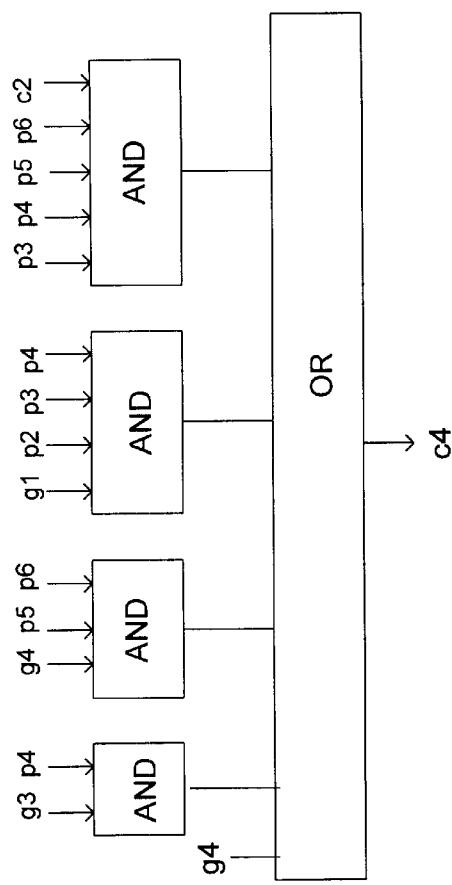
FIGS. 12A and 12B are diagrams illustrating example logic circuits for generating high-order bit carries.
Figure 12A:
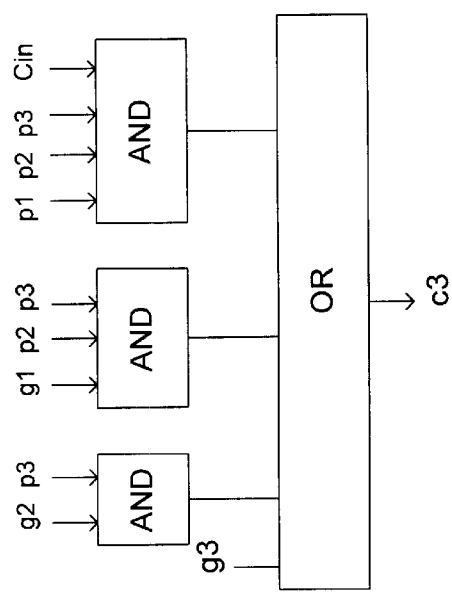
Figure 12B:
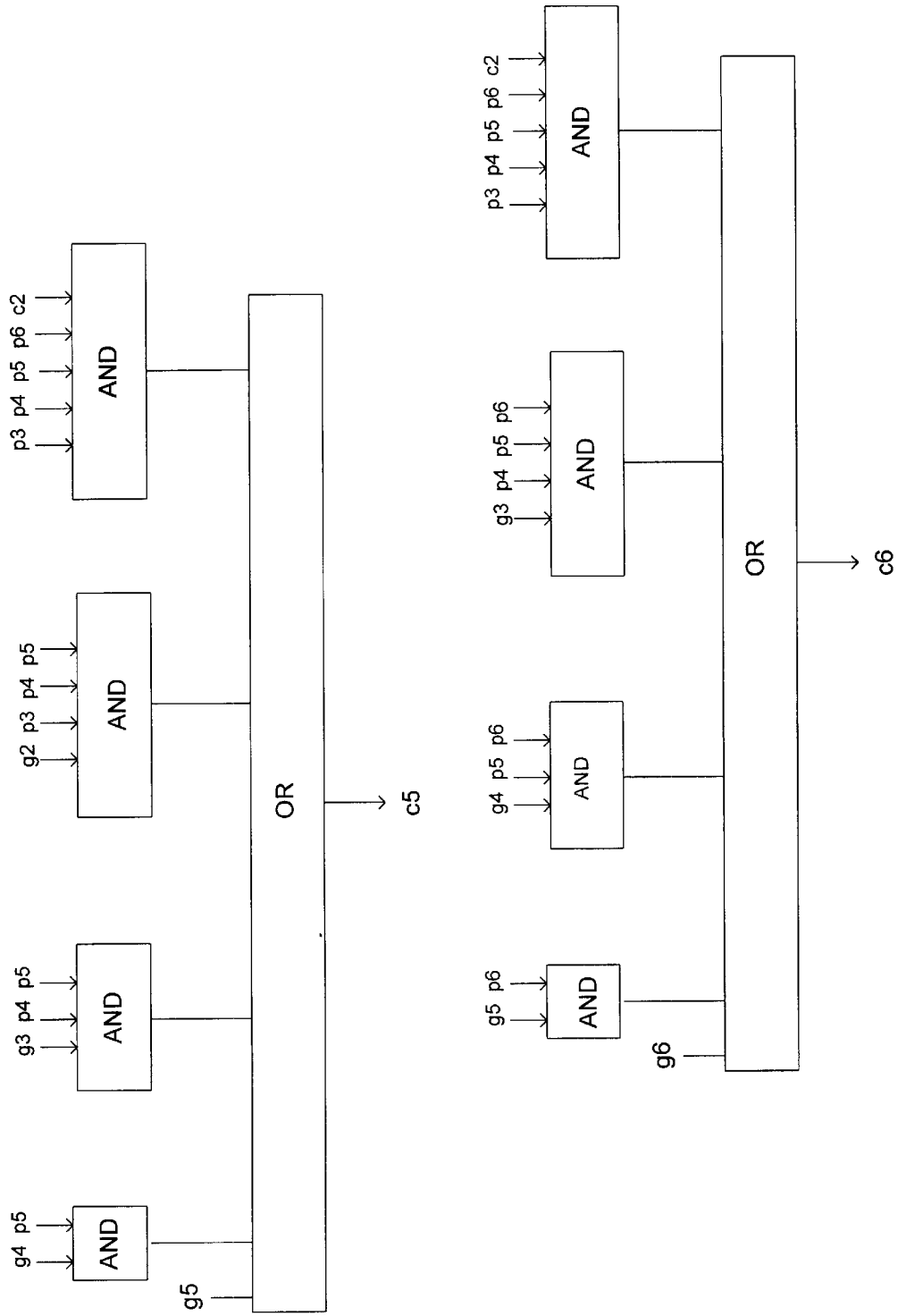

FIGS. 12A & 12B are diagrams illustrating example logic circuits for generating the high-order bit carries $c_3$, $c_4$, $c_5$, and $c_6$.

Referring again to FIG. 6, logic level 5 is digitwise logic that receives K, L, and the low-order group carry generate and propagate values output from logic level 2 and generates a digit group carry generate and a digit group carry propagate for the whole digit.

Figure 13:
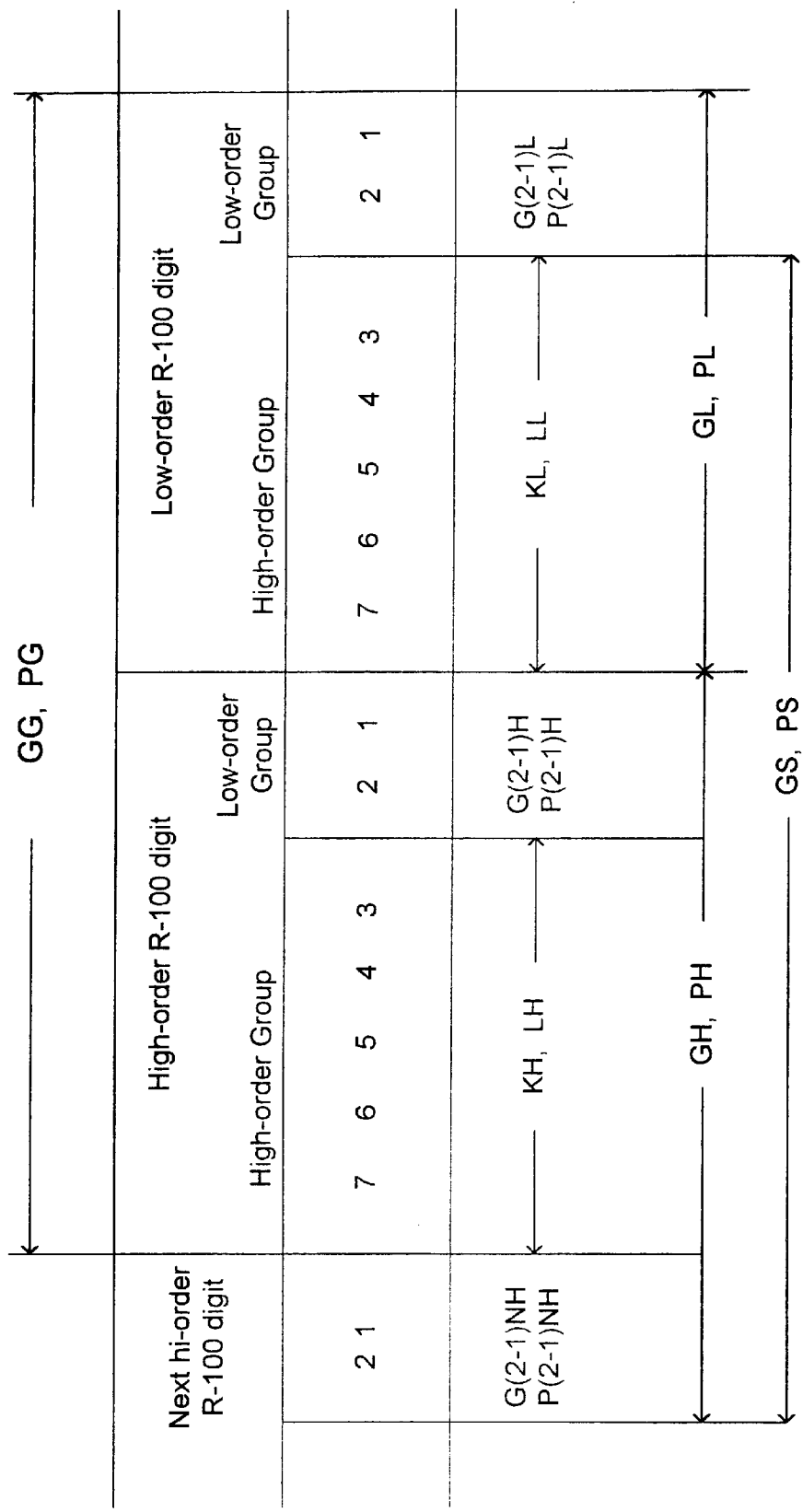
FIG. 13 is a diagram illustrating fourteen-bit grouping for two radix 100 digits.

FIG. 13 is a diagram illustrating fourteen-bit grouping for two radix 100 digits. The present invention provides several types of group carry generate and propagate functions. For the low-order group of bits in the low-order digit, a group carry generate G(2−1)L and group carry propagate P(2−1)L are generated. And for the high-order group of bits in the low-order digit, a high-order group carry generate KL and group carry propagate LL are generated. Also generated for the low-order digit are a digit group carry propagate (GL) and group carry propagate (PL) for all seven bits.

Similarly, for the low-order group of bits in the high-order digit, a group carry generate G(2−1)H and group carry propagate P(2−1)H are generated. And for the high-order group of bits in the high-order digit, a high-order group carry generate KH and group carry propagate LH are generated. Also generated for the high-order digit are a digit group carry propagate (GH) and group carry propagate (PH) for all seven bits.

In addition, the present invention provides a group carry generate straddle (GS) and a group carry propagate straddle (PS), which extend from the high-order group of bits of the low-order digit to the low-order group of bits of the next higher digit (NH).

Figure 14:
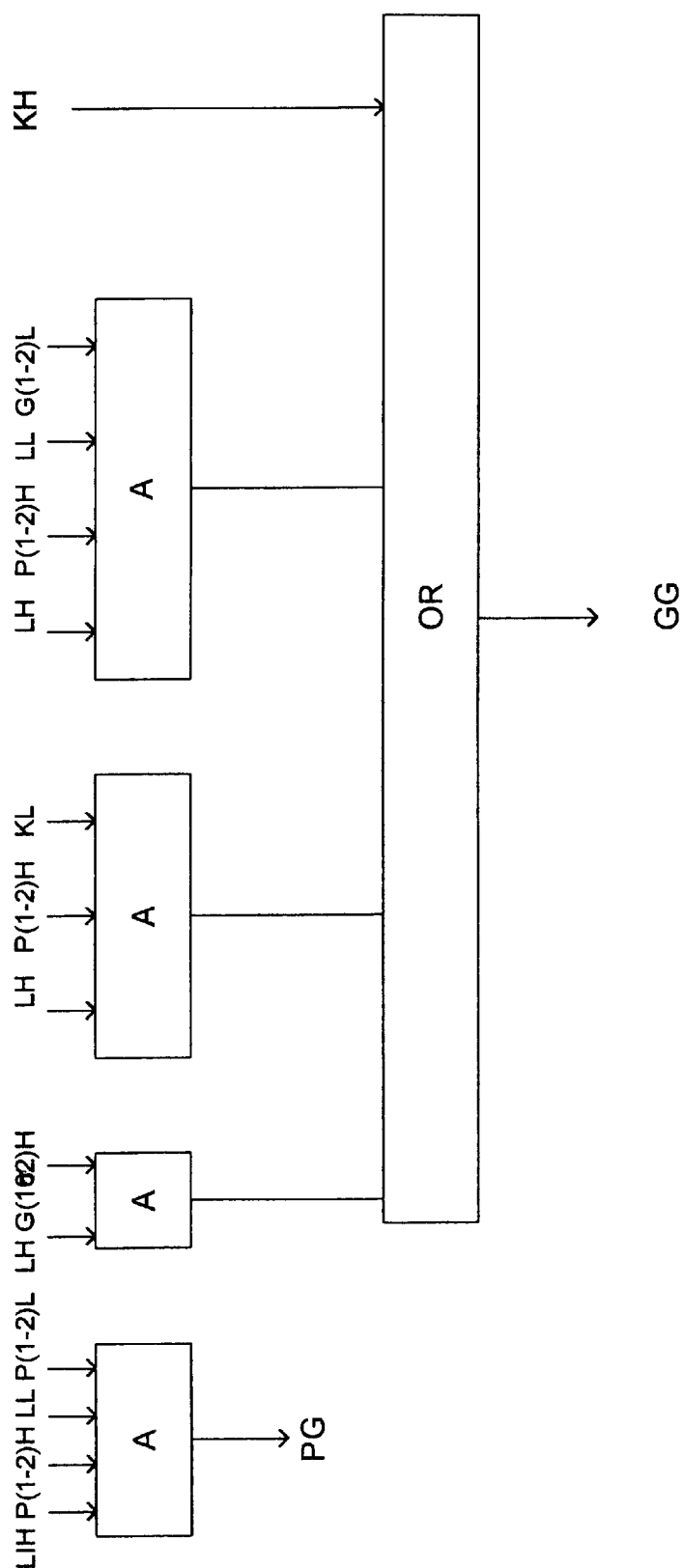
FIG. 14 is a block diagram illustrating example logic circuits for generating the group carry generate and propagate functions for the fourteen-bit group.

FIG. 14 is a block diagram illustrating example logic circuits for generating the group carry generate and propagate functions for the fourteen-bit group. Using the values of the group carry functions described above, a group carry generate (GG) and group carry propagate (PG) are generated by:

$GG=GH+PH*GL=KH+LH\ G(2-1)\ H+LH*P(2-1)H*KL+LH*P(2-1)\ H*LH*P(2-1)H*LL*G(2-1)L$ $PG=PH*PL=LH*P(2-1)H*LL*P(1-2)L$

Those with ordinary skill in the art will readily recognize how to use GG and PG to generate $C_{out}$ and how to extend these principles to express the group carry generate and propagate functions for wider adder 60s, such as a 28 bit adder 60 or 56 bit adder 60, for instance.

Referring again to FIG. 6, logic level 6 implements digitwise logic that receives the output from logic level 1 and logic level 3 and generates a final sum ($s_i$) for each digit based on the $C_{out}$ and the half sums ($h_i$). As described above, the sums for the high-order group, bits 7 through 3, are independent of the sums for the low-order group, bits 2 and 1. Therefore, they are generated separately.

Figure 15:
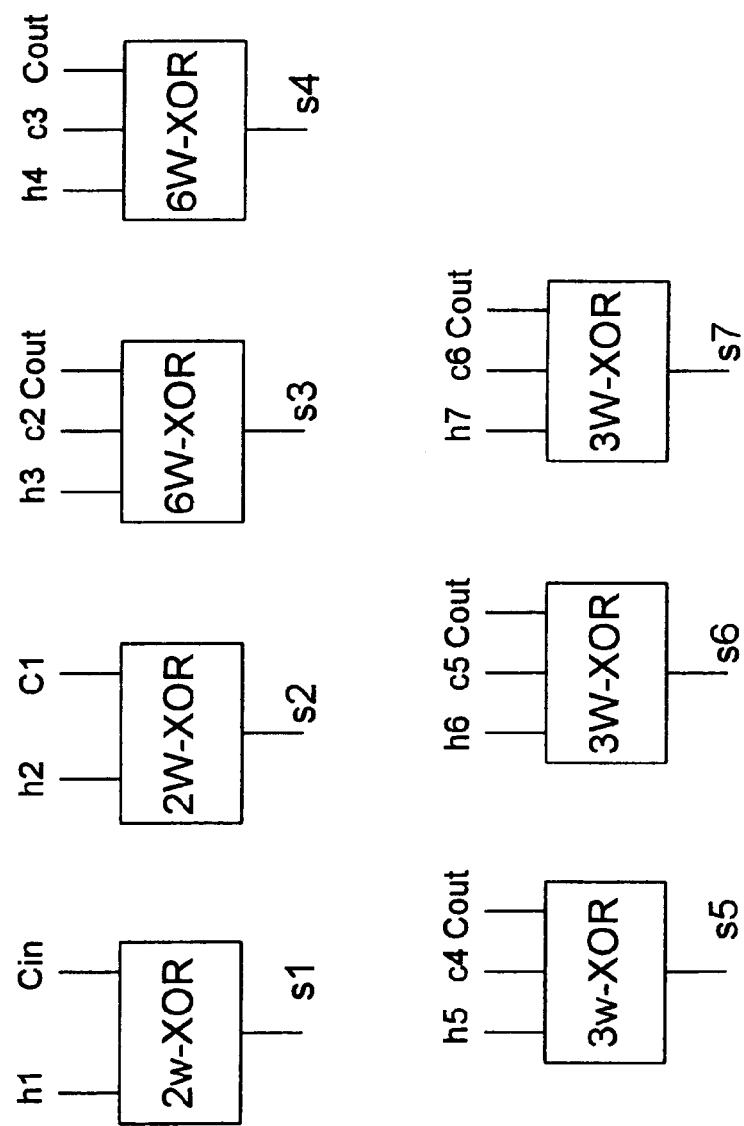
FIG. 15 is a block diagram illustrating example logic circuits for generating a full sum.

FIG. 15 is a block diagram illustrating example logic circuits for generating a full sum. The full sum for the low-order group is given by $s1=h1\oplus C_{in}$, and $s2=h2\oplus c1$.

However, the sum bits for the high-order group are not only a function of bit carries from the (i−1) bit position, but also of the radix 100 digit $C_{out}$. Therefore $S3=h3\oplus c2\oplus C_{out}$ $S4=h4\oplus c3\oplus C_{out}$, etc.

The general principles of look-ahead apply when adding additional digits. In an alternative embodiment, s3 can be expressed in terms of h3, c2, K and L by substituting for $C_{out}$ and complement $C_{out}$.

The radix 100 adder 60 may also be used for subtraction. In binary systems, subtraction is often performed by adding the 2's complement of subtrahend to the minuend. If the result is negative, as indicated by the lack of a high order carry, then the result is again complemented in the following cycle to obtain the proper magnitude. The 2's complement is obtained by using the 1's complement and forcing a carry into the lower order position. As is well known, the 1's complement is obtained simply by inverting each bit.

With the radix 100 adder 60 of the present invention, the method for performing radix 100 subtraction requires a "100" complement, which is the complement of ninety-nine plus a hard 1. For example, for a 7-bit radix 100 digit (a7 a6 a5 a4 a3 a2 a1), the 100 complement (C) for each bit is:

$C1=\bar{a}1$ $C2=\bar{a}2$ $C3=\bar{a}3$ $C4=a3\oplus a4$ $C5=\bar{a}3*a5+a4*\bar{a}5+a5*\bar{a}3*\bar{a}4$ $C6=a7+\bar{a}3*\bar{a}4*\bar{a}5*\bar{a}7$ $C7=a6*a7+a3*a4*a5*a7$ Similarly, for radix 1000 subtraction, a 1000 complement would be used, which is the complement of 999 plus a hard 1.

There are many ways that the above expressions can be simplified to match the delay types of various technology (fan-in fan-out characteristics, circuit adopting capability, use of power circuits except for), the details of which are outside of the scope of this document. However, a radix 100 or radix 1000 adder 60 designed in accordance with the above principles should be as fast as today's state-of-the-art high-speed parallel binary adders.

A method and apparatus for performing arithmetic using a high-speed radix 100 parallel adder 60 has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

What is claimed is:

1. A radix 100 parallel adder comprising:
   a first logic level for receiving at least two operands, each operand including at least one radix 100 digit having seven bit positions partitioned into a low-order group and a high-order group, and for generating outputs comprising a bit carry propagate value, a bit carry generate value, and half sum value for each bit position;
   a second logic level for receiving the output from the first logic level and for generating outputs comprising group carry propagate values and group carry generate values wherein the second logic level generates a low-order group carry generate value, a low-order group carry propagate value, a high-order group carry generate (K) value, and a high-order group carry propagate (L) value;
   a third logic level for receiving the output from the second logic level and for generating outputs comprising a digit carry-out value;
   a fourth logic level for receiving the outputs from first logic level and for generating outputs comprising bit carry values;
   a fifth logic level for receiving the output from the second logic level and for generating outputs comprising a digit group carry generate and a digit group carry propagate for the at least one radix 100 digit; and
   a sixth logic level for receiving the output from the first logic level and the outputs from the fourth logic level and for generating a final sum for the at least one radix 100 digit.

2. The adder of claim 1 wherein the low-order group comprises bit positions 2 and 1, and the high-order group comprises bit positions 7 through 3.

3. The adder of claim 2 wherein the first logic level further receives a carry-in ($c_{in}$) from a lower order digit.

4. The adder of claim 3 wherein the first logic level generates a bit carry propagate ($p_i$) value, a bit carry generate ($g_i$) value, and a half sum ($h_i$) value for each bit position (i=1–7).

5. The adder of claim 4 wherein the low-order group carry propagate function for bits 2 and 1 ($P_{2,1}$) is given by:

$$P_{2,1} = p1 * p2;$$

and the low-order group carry generate function for bits 2 and 1 ($G_{2,1}$) is given by:

$$G_{2,1} = c2.$$

6. The adder of claim 5 wherein the high-order group carry generate function (K) is given by $$K = g7 + p7*p6*p5 + p7*p6*p4 + p7*p6*p3 + p7*p6*p5 + g6*g5*p4 + g6*g5*p3 + g6*p5*g4*p3,$$

and the high-order group carry propagate function (L) is given by $$L = p7*p6 + p7*g5 + p7*p5*g4 + g6*g5 + g6*p5*g4.$$

7. The adder of claim 6 wherein the digit carry-out ($C_{out}$) value is given by $$C_{out} = K + L * c2.$$

8. The adder of claim 7 wherein the bit carry values for bit positions 2 and 1 are generated by $$c1 = g1 + C_{in} * p1$$

$$c2 = g2 + g1*p2 + C_{in}*p1*p2.$$

* * * * *